May 15, 1934.  W. L. SMITH  1,959,309
AIRCRAFT ATTITUDE INDICATOR
Filed Aug. 23, 1932
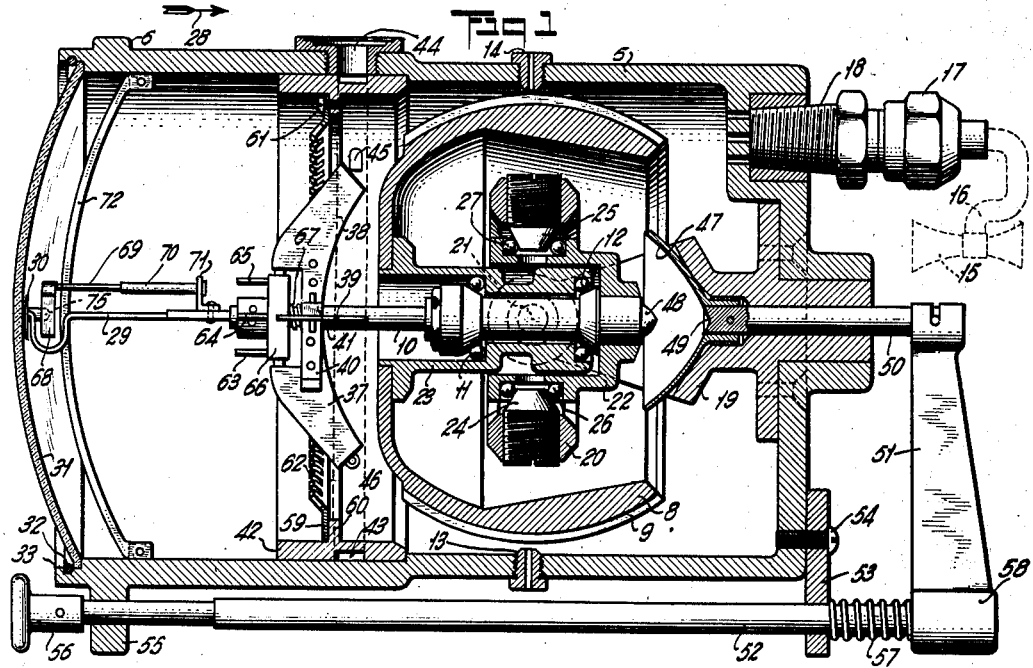
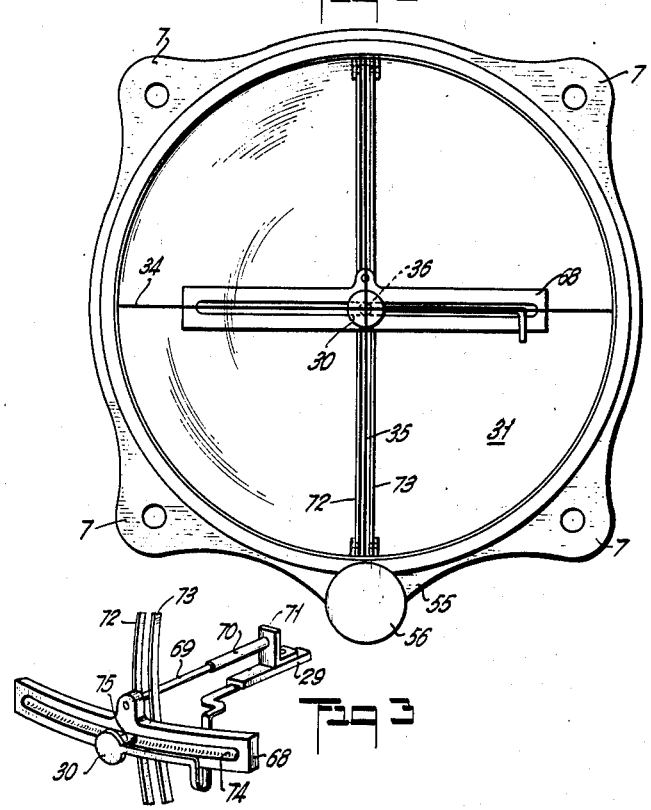
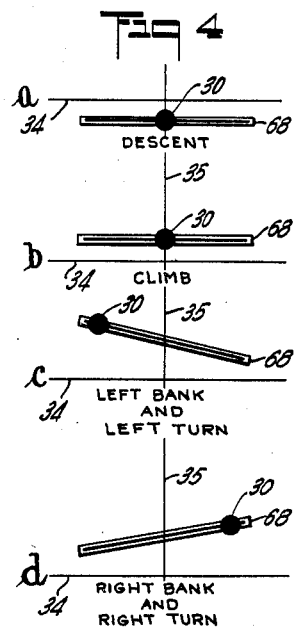
INVENTOR.
WESLEY L. SMITH.
BY Stephen Cerstvik.
ATTORNEY.

Patented May 15, 1934

1,959,309

UNITED STATES PATENT OFFICE 1,959,309

AIRCRAFT ATTITUDE INDICATOR

Wesley L. Smith, Cranford, N. J., assignor, by mesne assignments, to Eclipse Aviation Corporation, East Orange, N. J., a corporation of New Jersey Application August 23, 1932, Serial No. 630,135

7 Claims. (Cl. 33—204)

The present invention relates to an indicating device, and more particularly to an instrument for indicating the attitude of an aircraft or other mobile object with respect to its three axes.

One of the objects of the invention is to provide a novel bank and turn indicator particularly suitable for aircraft and which is also adapted to indicate the pitch of the craft by means of unitary indices.

Another object is to provide a novel indicator embodying a universally supported gyroscopic element having a pointer thereon adapted to indicate the attitude of a mobile object with respect to two of its axes, and embodying novel means associated with and operated by the pointer whereby the attitude of the craft with respect to its third axis perpendicular to the first two mentioned axes may be indicated.

Still another object is to provide in an indicator of the class described, a novel construction whereby the pointer remains relatively non-rotatable with respect to the gyroscopic element with which it is associated and including novel means whereby the attitude of a mobile object with respect to its three axes may be indicated by two cooperating indicating elements positioned in the same field of view.

The above and other objects and advantages of the invention will appear more fully hereinafter from a consideration of the detailed description which follows, taken together with the accompanying drawing wherein is illustrated one form of embodiment of the invention. It is to be expressly understood however, that the drawing is for the purpose of illustration and description only and is not designed as a definition of the limits of the invention, reference being had for this purpose to the appended claims.

In the drawing wherein like reference characters refer to like parts throughout the several views, Fig. 1 is a longitudinal section of one form of instrument embodying the present invention;

Fig. 2 is a front view of the instrument showing the dial and the relation of the pointer thereto in its normally centralized position;

Fig. 3 is a detailed perspective view of one form of novel construction embodying the present invention; and Fig. 4 is a diagrammatic illustration showing the manner of operation of the novel instrument in four different attitudes of the mobile object on which the instrument is mounted.

The invention embodies an indicator or pointer carried by a gyroscope having three degrees of freedom rotatable about an axis parallel to the longitudinal axis of the mobile object and arranged to be actuated upon movement of the object about two of its axes at right angles to each other as disclosed in a copending application of Adolf Urfer, Serial No. 582,145, filed December 19, 1931, and also includes a novel auxiliary indicator associated with and operated by said first indicator whereby the attitude of the mobile object with respect to its third axis may be indicated.

Referring to the drawing, and more particularly to Fig. 1, the instrument embodying the invention comprises an air-tight casing 5, preferably of some suitable light weight material such as aluminum or a phenolic condensation product, and is provided with an annular flange 6 for mounting the instrument on a panel in any suitable manner, as for example by means of lugs or ears 7. The gyroscopic element is constituted by a rotor 8 having turbine buckets 9 on its periphery and journaled on a relatively stationary shaft 10 in any suitable manner as by means of ball bearings 11 and 12.

Means are provided for driving the rotor 8 on its shaft 10 by the action of an air stream impinging against the buckets 9 as in a steam turbine, and in the form shown comprise nozzles 13 and 14 which may be secured to the wall of the casing 5 in any suitable manner, as for example by threaded engagement therewith. The air stream through the nozzles 13 and 14 may be produced by creating a suction within the casing in any manner desired, as for example by suction pump (not shown) or by a Venturi tube 15 connected to a pipe 16 secured to the casing as by means of the coupling member 17 and threaded nipple 18. It will be apparent that as air is withdrawn from the casing by means of the Venturi tube 15 through the pipe 16 a supply of air will enter the casing from the exterior thereof through the nozzles 13 and 14 which is caused to impinge on the buckets 9 thereby imparting rotation to the gyro rotor 8 on the shaft 10 through the ball bearings 11 and 12.

The shaft is universally supported on a rigid member 19 which may be secured to or formed integral with the casing 5. In the form shown, the universal mounting comprises a gimbal ring 20 pivoted on the member 19 at an axis passing through the center of the ring at right angles to the plane of the drawing, said axis being shown at 21 and pivotally associated with the gimbal ring 20 is a hollow, substantially cylindrical member 22 within which is carried the rotor 8 by means of a tubular member 23, the pivotal connection between the member 22 and the gimbal ring 20 being constituted by adjustable pivots 24 and 25 which coincide with an axis perpendicular to the axis 21 and form bearing surfaces which cooperate with ball bearings 26 and 27 whereby the rotor 8 and the shaft 10 may move about said vertical axis. The rotor 8 is arranged in such a manner and designed to be of such weight that, together with the shaft 10, it will have its longitudinal axis perfectly balanced on the gimbal ring 20. It will be seen that when the rotor 8 is brought up to a predetermined speed, the gyroscopic effect thereof will tend to maintain its axis stationary when the casing 5 is turned about a vertical axis or about an axis perpendicular to the plane of the drawing corresponding to a turn and pitch, respectively, of an aircraft on which the casing is mounted, thereby producing relative angular movement between the rotor and the casing. If, for example, the craft is flying in the direction of the arrow 28 and inclines upward, the relative movement of the shaft 10 on its universal support will be upward, and if the craft inclines downward the relative movement of said shaft with respect to the casing will also be downward about the horizontal axis 21 of the gimbal ring 20. In the case of a turn of the craft to the left or right the relative movement of the shaft 10 will also be to the left or to the right with respect to the casing about the axis formed by the pivots 24 and 25.

Means are now provided for employing the relative movements of the shaft 10 with respect to the casing 5 to produce visible indications of such movements, thereby indicating the attitude of the craft about its vertical and transverse axes, respectively, and, in the form shown, comprise a pointer 29 secured to or formed integral with the shaft 10 and having a circular disc 30 at the end thereof which cooperates with a dial 31, the latter of which also forms a cover-glass for the instrument and therefore is made of suitable transparent material such as glass. The combined dial and cover-glass 31 may be secured to the front of the casing 5 in any suitable manner known to those skilled in the art, as for example, by means of a split clamping ring 32 positioned within a groove formed by an annular flange 33 at the front of the instrument. Etched on the cover-glass 31, or marked thereon in any other suitable manner, is a horizontal line 34 and a vertical line 35, which lines intersect each other at right angles as indicated at 36, the intersection being the normal central position of the disc 30 and hence the pointer 29, and coincides with the longitudinal axis of the rotor 8 and the shaft 10.

It will be apparent from the foregoing that by virtue of the particular construction of the rotor mounting, the rotor is not driven through its universal support thereby producing no torque acting on said rotor to return it to normally central position when the axis thereof is changed due to a turn or pitch and, therefore, novel means are provided for causing the axis of the rotor and the shaft 10 to return to said normally central position with respect to the universal support. In the form shown, said means comprise two mutually perpendicular pairs of plates or vanes, one pair of said vanes being shown at 37 and 38, and one of the other pair of vanes being shown at 39, the second vane of the second pair being on the opposite side of shaft 10 and not seen in the drawing. The vanes are secured to the relatively stationary shaft 10 in any suitable manner as by means of brackets, two of which are shown at 40 and 41. Cooperating with the vanes are a series of air jets spaced circumferentially about the inner surface of a collar 42 which has a close fit within the casing 5 and which is provided with an annular passage 43 to which a source of fluid is supplied by means of an opening 44 which communicates with the exterior of the casing. One of the jets is shown at 45 which cooperates with the horizontal vane (not shown) on the side of the shaft 10 opposite the vane 39 and another of said jets is shown at 46 which cooperates with the vane 37. A stream of air is emitted from these jets from the exterior of the casing in the same manner as the stream which drives the rotor 8, i.e., by the suction produced within the casing by the Venturi tube 15. The vanes and the jets are so arranged that when the shaft 10 is in its normally central position the air-stream from each of the jets just clears each associated vane so that no action is produced on the vanes. If, however, pointer 29 moves upward or downward or to the left or right due to changes in the position of the axis of the gyroscope by virtue of a pitch or turn of the craft, one of the plates will move into the air-stream of its associated jet as, for example, if the pointer moves downward the plate 37 will move into the air-stream of the jet 46. The action of the air-stream from said jet on the plate will tend to move the gyro axis in a direction perpendicular to the plate, but in so doing a precessional force is created which moves the gyro axis, and consequently the pointer 29, upward until the plate 37 is again clear from the air-stream from jet 46. If the pointer moves upward or to the left or right the corresponding jets will cause the gyro to precess back to normally central position until the plates are clear of their associated air jets. If a compound motion is imparted to the pointer so that it is moved in two directions simultaneously, two or more of the jets will then direct a stream of air onto their associated plates to produce the required precessional force for returning the pointer to normal position. The return movement of the pointer is substantially on a straight radial line and is very gradual without producing any oscillation of the pointer. The rate of return can be easily varied by changing the size of the jets which may be either removable or provided with a suitable valve interposed in the opening 44 for governing the amount of air passing through the jets.

It will be seen that since the centralizing vanes and air jets are independent of the driving means of the gyroscope element, the centralizing force can be adjusted so as to obtain any desired rate of return of the pointer. When this adjustment is made then the rate of return of the pointer remains fixed, unless readjusted again, even though the suction through the Venturi tube 15 increases because the velocity of air will increase through the centralizing jets as well as through the nozzles 13 and 14. Hence the ratio of the centralizing force and the driving force will remain constant for any particular adjustment of the air jets.

Under certain conditions it is desirable to be able to centralize the gyro instantaneously. This is especially true in starting the device in operation and after a violent manoeuver of the aircraft on which the device is mounted, during which time the position indicated by the pointer is doubtful. To this end, a novel rapidly centralizing unit is provided to permit centralizing of the pointer from the front of the instrument independently of the action of the centralizing vanes and, in the form shown, comprise means constituted by a concave member 47 which is adapted to engage the exterior surface of the member 22 and a tapered projection 48 formed on the journal of the shaft 10, said projection 48 being adapted to be seated in a recess 49 formed at the center of the concave member 47. The member 47 is secured to and adapted to be actuated by a shaft 50 which extends through the support 19 and the casing 5, said shaft being connected to and movable with an arm 51 which is secured to or formed integral with an actuating rod 52 arranged parallel to the shaft 50 and passing through a bracket 53 secured to the rear wall of the casing 5, as by means of a screw 54, and through a hole provided in a projection 55 of the annular flange 6 in front of the casing. The rod 52 may be actuated from the front of the casing by means of a knob 56 secured at the end thereof, against a compression spring 57 interposed between the bracket 53 and an enlarged portion 58 of the arm 51, said spring normally maintaining the concave member 47 out of engagement with the projection 48.

From the arrangement of the pointer 29 with respect to the interior of the casing, it will be seen that if the pointer is moved beyond a predetermined limit as defined by the wall of the casing, it will strike against the latter and unless some means are provided for stopping the pointer, an undesirable oscillation thereof would be produced, and accordingly means are provided for eliminating such oscillations. As shown, said means comprise a toothed ring 59 secured to a flange 60 provided on the inner wall of the collar 42 in any suitable manner as by means of a plurality of circumferentially spaced screws, one of which is shown at 61. Arranged to cooperate with the teeth or serrations 62 of the ring 59 are four pins, three of which are shown at 63, 64 and 65, the fourth one being on the opposite side of the shaft 10 in the same plane with the pin 64, said pins being secured to or formed integral with a bushing 66 which is mounted for limited rotational movement on the shaft 10. A coil spring 67 is provided for counteracting the rotation of bushing 66 and has one end connected to the said bushing and the other end to the shaft 10. The teeth or serrations 62 are inclined in the direction of rotation of the rotor 8 so that when the pointer 29 is moved to its limit, upward or downward or to the left or right, the pins will fall into one of the serrations. Since the pins would strike the ring 59 with some force they would tend to break off, but by the action of the coil spring 67 such breaking is prevented because the shock is taken up by the winding up of the spring by the limited movement of the bushing 65 thereby producing a force which tends to move the pin out of the serration after the aircraft has ceased turning or pitching, thus permitting the vanes to gradually return the pointer to its normally centralized position.

With the construction described so far, the pointer 29 would indicate movements of the craft only about its vertical and transverse axis and, therefore, novel means are provided for also indicating the movement of the craft about its longitudinal axis, namely to indicate the bank of the craft. In the illustrated embodiment said means comprise an auxiliary indicator constituted by a horizontal member 68 (Fig. 3) pendulously supported transversely of the pointer 29 by a rod 69 which is adapted to telescope within a tube 70 extending horizontally from and carried by a bracket 71 pivotally secured to the pointer 29, as shown at 71a, for movement about a vertical axis with respect to said pointer. The rod 69 is guided for vertical movement with the pointer 29 by means of a pair of guides 72 and 73 secured to and within the casing 5 near the cover-glass 31. The member 68 is provided with a slot 74 within which the disc or index 30 is guided by means of a pin 75. In order that the disc 30 may move with the pointer 29 to the left and right of the guides 72 and 73 and to prevent interference of the pointer 29 with the member 68, said pointer is provided with an extension having the configuration shown in Fig. 3, i. e., it extends from the pointer 29 and then is curved in the form of the letter S in a horizontal plane and then bent downwardly at right angles and then upwardly to provide a loop sufficiently wide to permit the member 68 to fall therewithin, and is again bent at right angles in a vertical plane so that when the pointer 29 is in its normally central position the disc 30 will be midway between the ends of the slot 74. By this construction, when the pointer 29 moves upward or downward the horizontal member 68 will move with it and will be guided by means of the rod 69 within the guides 72 and 73, thereby giving an indication of descent or climb as indicated in examples a and b shown in Fig. 4. If the aircraft moves to the left or to the right without banking (which seldom happens) the pointer 29 will move to the left or to the right, carrying with it the disc 30 and the pin 75 in the slot 74, but the member 68 is prevented from such left and right movement by the rod 69 which is constrained within the guides 72 and 73, although relative movement about a vertical axis may take place between rod 69 and pointer 29 because of the pivotal connection of the bracket 71 to the pointer 29, at which time the rod 69 is withdrawn from the tube 70 due to the variations in length produced by such relative movement. If, however, the plane banks while making a turn the pin 75 being moved to one end or the other of the slot 74 will cause the member 68 to incline by virtue of its suspension on the rod 69 to give a simultaneous indication of bank and turn as shown in examples c and d of Fig. 4. Therefore, by noting the relative positions of the disc 30 and the horizon member 68 with respect to the horizontal line 34 and the vertical line 35 provided on the cover-glass, the pilot immediately knows the attitude of his craft and can adjust his controls to bring the horizon member 68 in coincidence with the horizontal line 34 and the disc 30 in coincidence with the intersection 36 which gives an indication of level flight. In the event that the plane banks to the left or to the right without turning or pitching the disc 30 will remain at the intersection 36, but due to the pendulosity of the member 68 the latter will indicate such bank. Various other compound motions may be obtained for various manœuvers to which an aircraft may be subjected and which a pilot can quickly and readily interpret.

There is thus provided a novel indicator adapted for simultaneous indication of the attitude of the craft with respect to all three of its axes and the pointer of which may be centralized slowly by automatic air centralizing means, or may be centralized instantaneously by manual means.

Although only one embodiment of the invention has been illustrated and described, other changes and modifications in the form and relative arrangement of the parts, which will now appear to those skilled in the art, may be made without departing from the scope of the invention. Reference is, therefore, to be had to the appended claims for a definition of the limits of the invention.

What is claimed is:

1. In an aircraft attitude indicator, a pointer, means for actuating the pointer in response to movements of an aircraft about two of the axes of the latter, and an auxiliary pointer operated by the first pointer when the craft is moving about its third axis and about one of the first-mentioned axes simultaneously for indicating the attitude of the craft with respect to said third axis.

2. An aircraft deviation indicator comprising, in combination, a casing, a non-rotatable shaft therein, a universal support for said shaft and secured to one end thereof, a gyroscope rotatably mounted on said shaft, fluid pressure means for driving said gyroscope, an indicator operated by the gyroscope in response to movements of an aircraft about two axes of the latter, and an auxiliary indicator associated with and operated by the first-named indicator in response to movements of the craft about the third axis of the latter.

3. An aircraft deviation indicator comprising, in combination, a casing, a non-rotatable shaft therein, a universal support for said shaft and secured to one end thereof, a gyroscope rotatably mounted on said shaft, fluid pressure means for driving said gyroscope, an indicator operated by the gyroscope in response to movements of an aircraft about two axes of the latter, an auxiliary indicator associated with and operated by the first-named indicator in response to movements of the craft about the third axis of the latter, and fluid pressure means for centralizing the gyroscope and the indicating means, said centralizing means comprising a plurality of vanes carried by and radially disposed about the non-rotatable shaft, and means for directing a jet of fluid pressure onto said vanes.

4. An aircraft deviation indicator comprising, in combination, a casing, a non-rotatable shaft therein, a support carried by the casing, means connecting one end of the shaft to the support for universal movement, a gyroscope rotatably mounted on said shaft, and an indicator operated by the shaft in response to movements of an aircraft about two axes of the latter, an auxiliary indicator associated with and operated by the first-named indicator in response to movements of the craft about the third axis thereof, and means carried by and effective upon relative movement of the shaft with respect to its support for centralizing the gyroscope and the indicator.

5. An aircraft deviation indicator comprising, in combination, a casing, a non-rotatable shaft having a pointer at one end thereof, a support for said shaft carried by the casing, said shaft being normally in alignment with said support, means interposed between the shaft and the support so that said shaft can incline at an angle to the longitudinal axis of the casing in response to movements of an aircraft about two of the three axes of the latter, a gyroscope rotatably mounted on said shaft for maintaining the latter normally in alinement with its support, means for driving said gyroscope, an auxiliary pointer associated with and operated by the first-named pointer in response to movements of the aircraft about the third axis of the latter, means associated with said first-named pointer and said casing for preventing oscillations of the pointer when the latter exceeds a predetermined angle of inclination, and means independent of the driving means for returning the pointers and shaft to normally centralized position at a predetermined rate after an inclination thereof.

6. An aircraft deviation indicator comprising, in combination, a casing, a non-rotatable shaft therein, a support carried by the casing, means connecting one end of the shaft to said support for universal movement, a gyroscope rotatably mounted on said shaft, an indicator operated by the shaft in response to movements of an aircraft about two axes of the latter, and an auxiliary indicator associated with and operated by the first-named pointer in response to movements of the aircraft about the third axis of the latter, said auxiliary indicator comprising a pair of telescoping members parallel to the shaft and movable with the latter about the transverse axis of the casing but relatively movable with respect to the shaft about a transverse axis of the casing perpendicular to the first-named axis, a horizontal member pendulously carried by and extending transversely of one of the telescoping members, and means connecting the first-named pointer with said horizontal member whereby the latter is adapted to indicate the bank of the craft upon turning thereof.

7. An aircraft deviation indicator comprising, in combination, a casing, a non-rotatable shaft therein, a support carried by the casing, means connecting one end of the shaft to said support for universal movement, a gyroscope rotatably mounted on said shaft, an indicator operated by the shaft in response to movements of an aircraft about two axes of the latter, and an auxiliary indicator associated with and operated by the first-named pointer in response to movements of the aircraft about the third axis of the latter, said auxiliary indicator comprising a pair of telescoping members parallel to the shaft and movable with the latter about the transverse axis of the casing but relatively movable with respect to the shaft about a transverse axis of the casing perpendicular to the first-named axis, a horizontal member pendulously carried by and extending transversely of one of the telescoping members, means connecting the first-named pointer with said horizontal member whereby the latter is adapted to indicate the bank of the craft upon turning thereof, and means for preventing transverse movement of said horizontal member by permitting the latter to indicate a bank of the craft.

WESLEY L. SMITH.